United States Patent [19]
Viemeister

[11] 3,748,750
[45] July 31, 1973

[54] BEHAVIOR SIMULATOR
[76] Inventor: Peter E. Viemeister, 14 Baywood Ln., Bayport, N.Y. 11705
[22] Filed: Feb. 3, 1972
[21] Appl. No.: 223,113

[52] U.S. Cl. .............................................. 35/22 R
[51] Int. Cl. ........................................... G09b 9/00
[58] Field of Search ................. 35/22 R, 9 D, 24 C, 35/21; 273/1 E, 161

[56] References Cited
UNITED STATES PATENTS
2,928,189  3/1960  Molner et al. ...................... 35/22 R
3,067,524  12/1962  Parker .................................. 35/9 D Primary Examiner—Wm. H. Grieb
Attorney—Virgil E. Woodcock, Richard E. Kurtz et al.

[57] ABSTRACT

A simulator of human behavior includes logic circuitry which is selectively adjustable to represent human characteristics on a relative value scale. Encoded representations of human situational stimuli are inputted to the simulator through a card reader. The cards have pictorial representations of objects or scenes, sounds and people or beings thereon. They are made of a transparent material so that the visual representations on a number of cards can be viewed simultaneously when they are placed in the card reader. Visual output indicators represent a plurality of different behavioral responses to the input stimuli. The output responses range between an aggressive response and a retreat response. The input stimuli are connected through the logic circuitry to selectively actuate different ones of the output responses.

13 Claims, 20 Drawing Figures

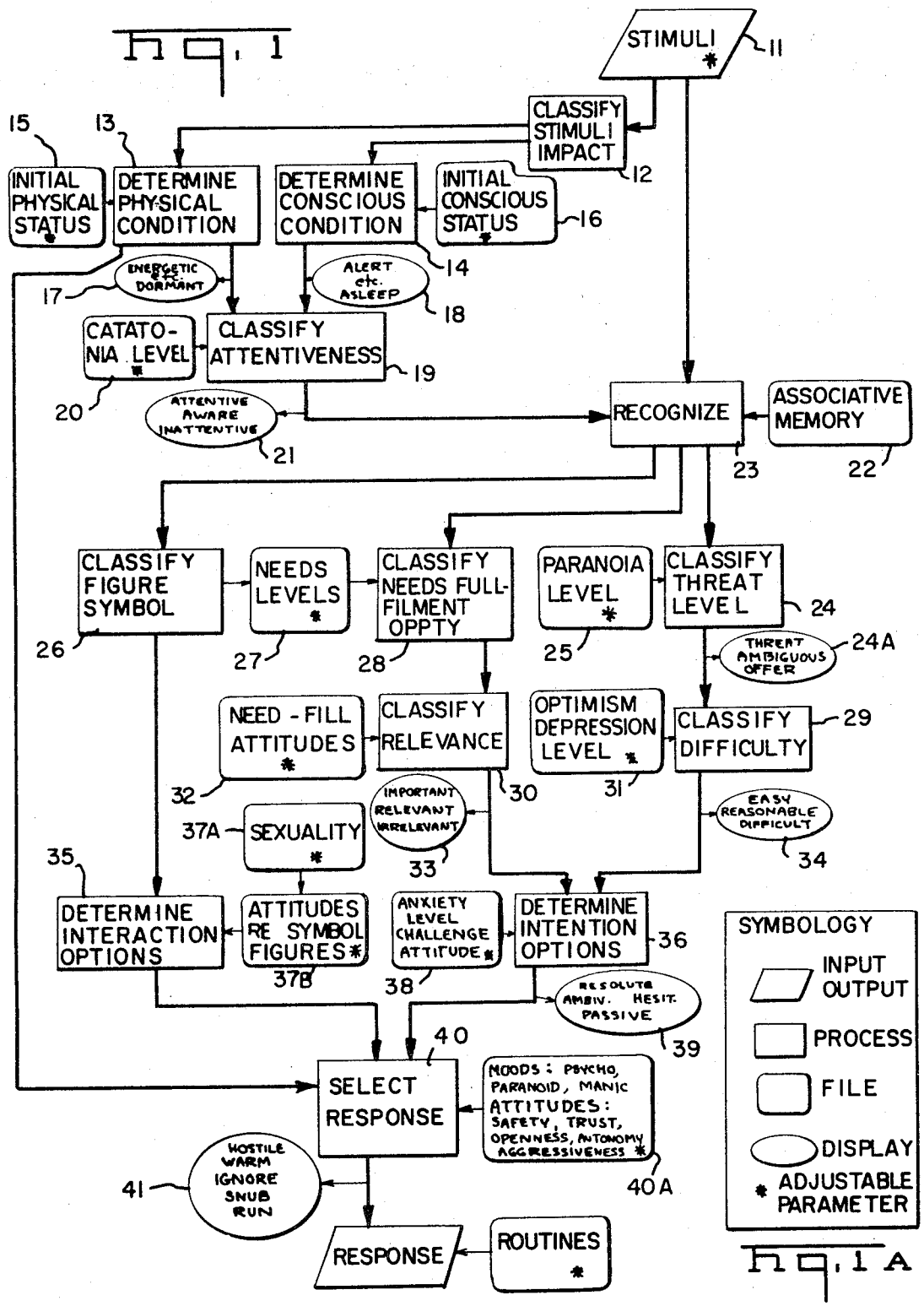

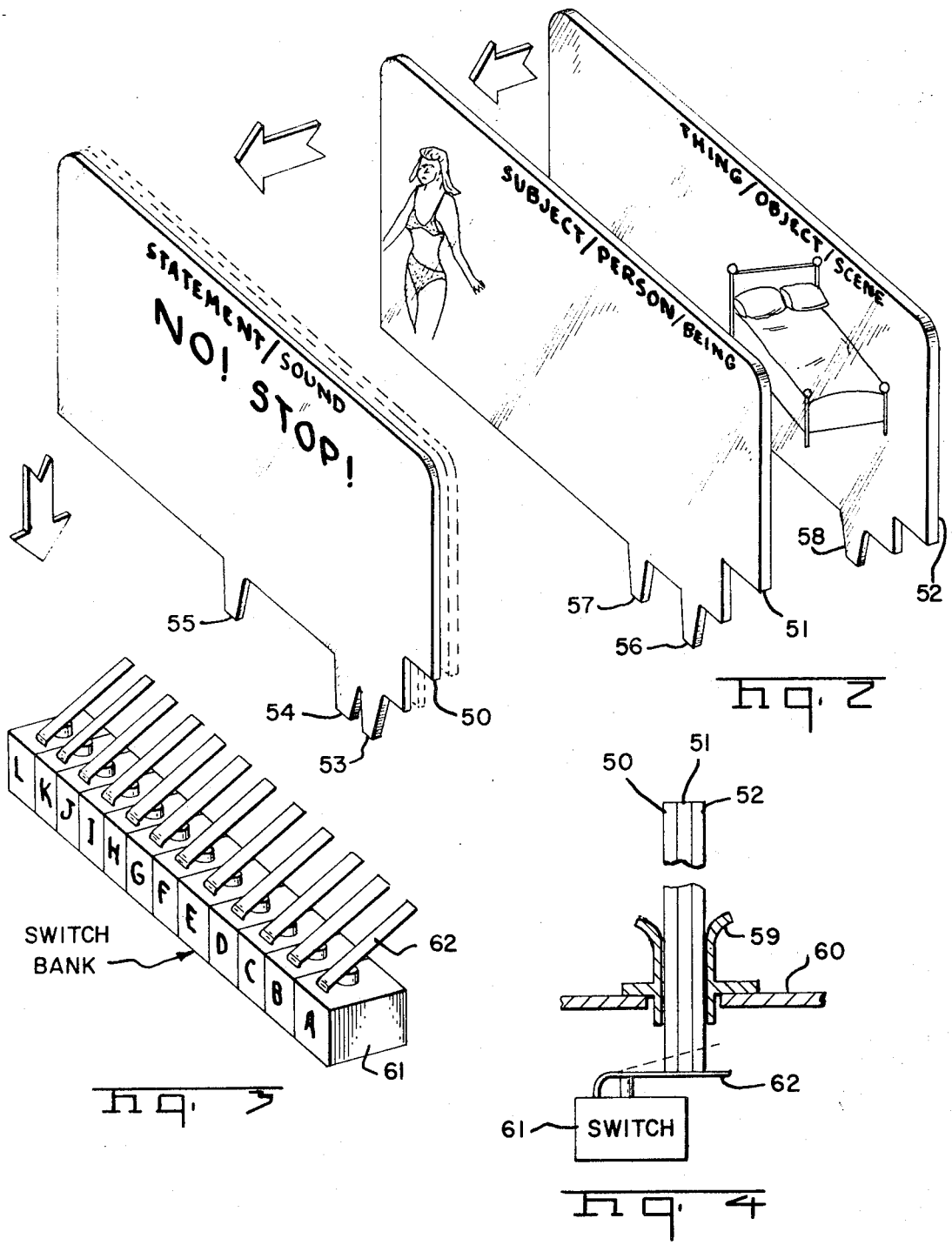

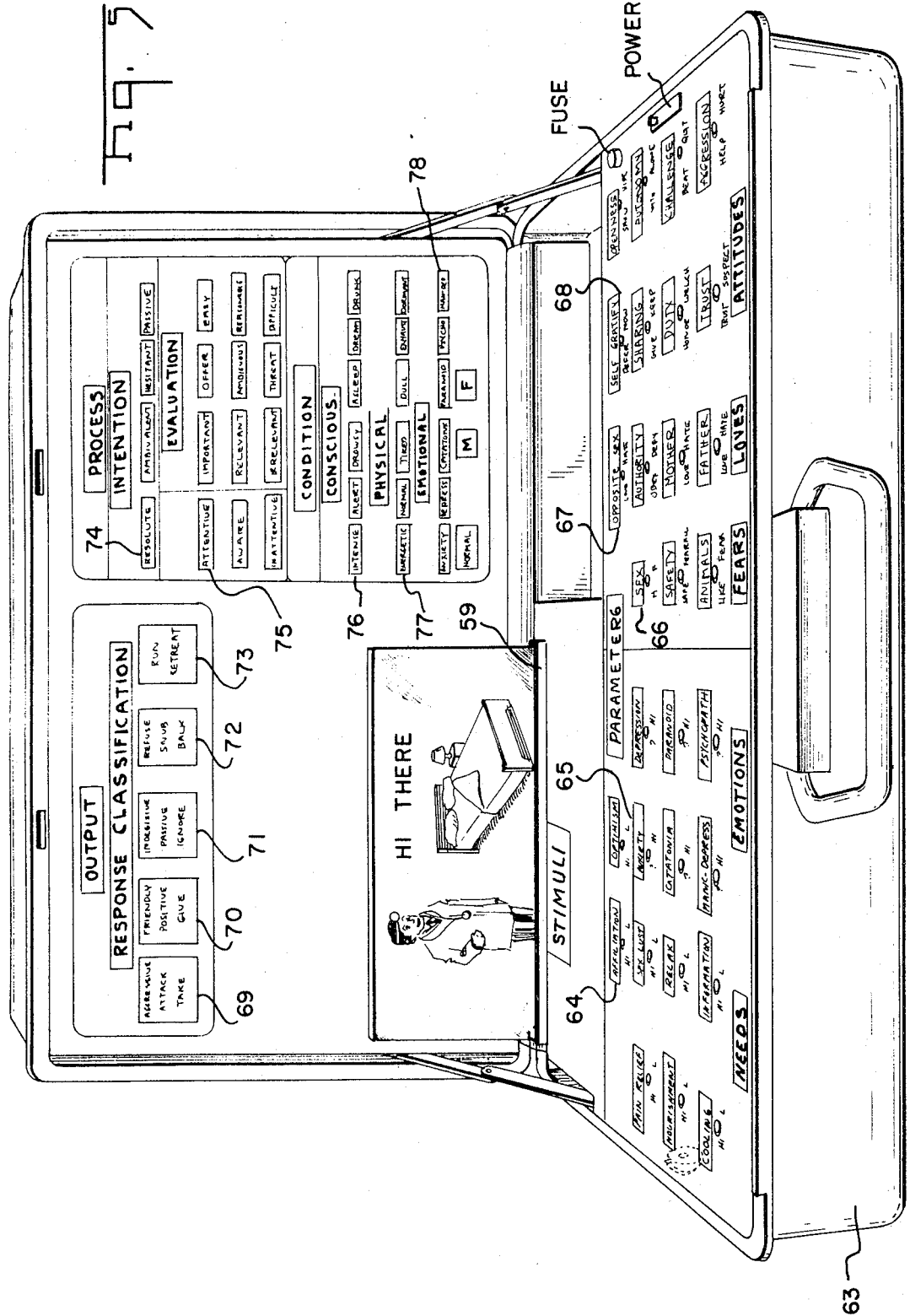

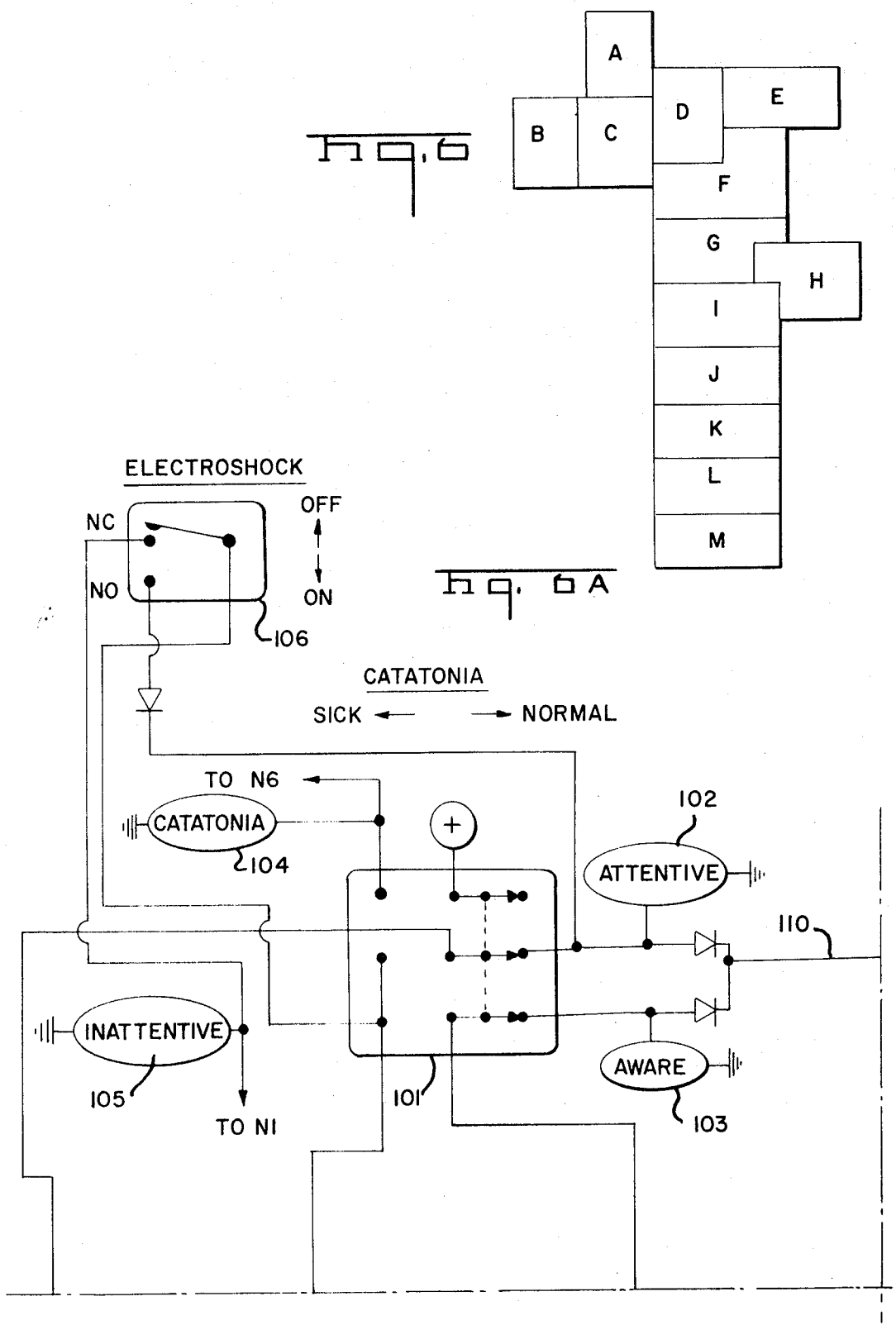

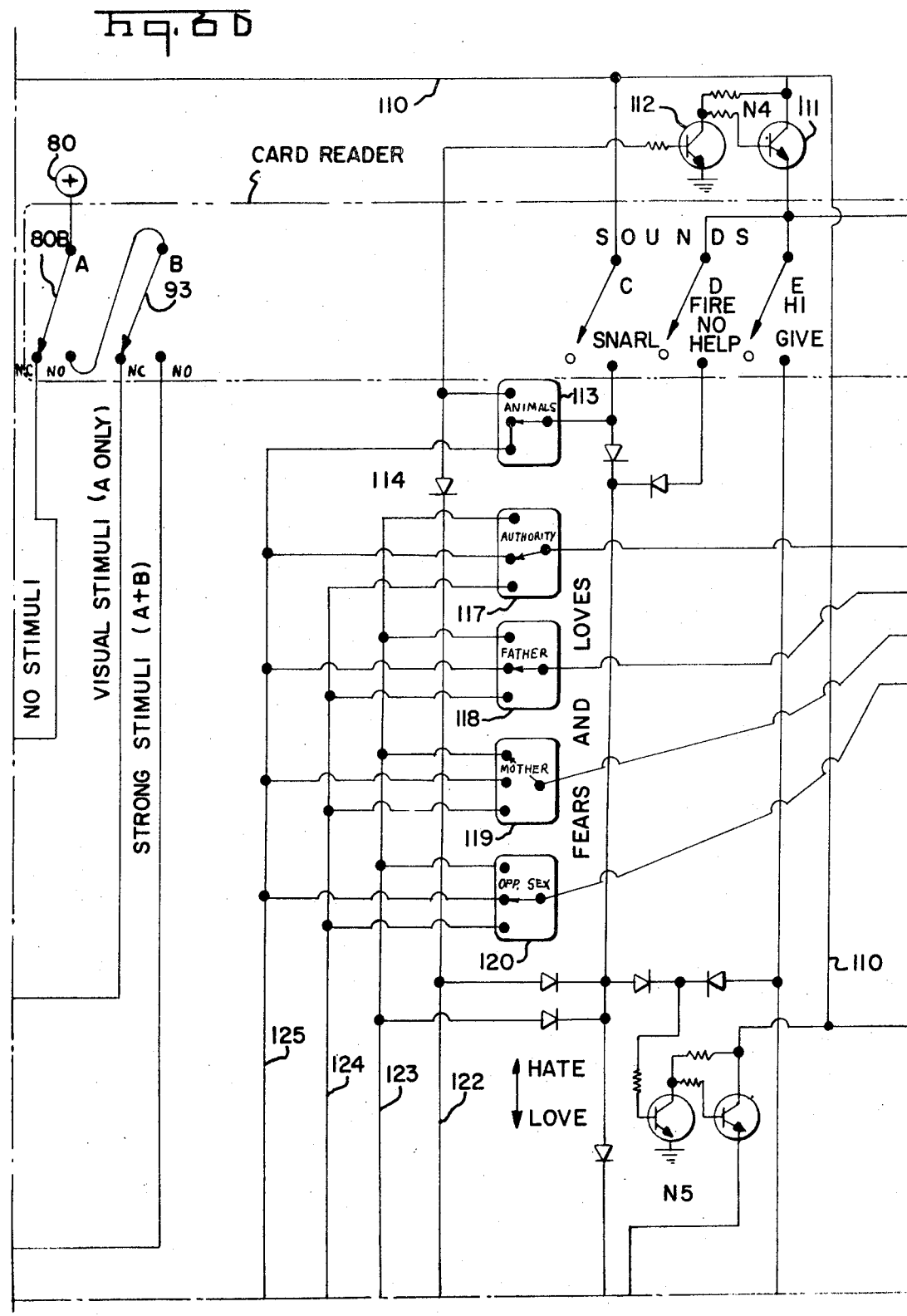

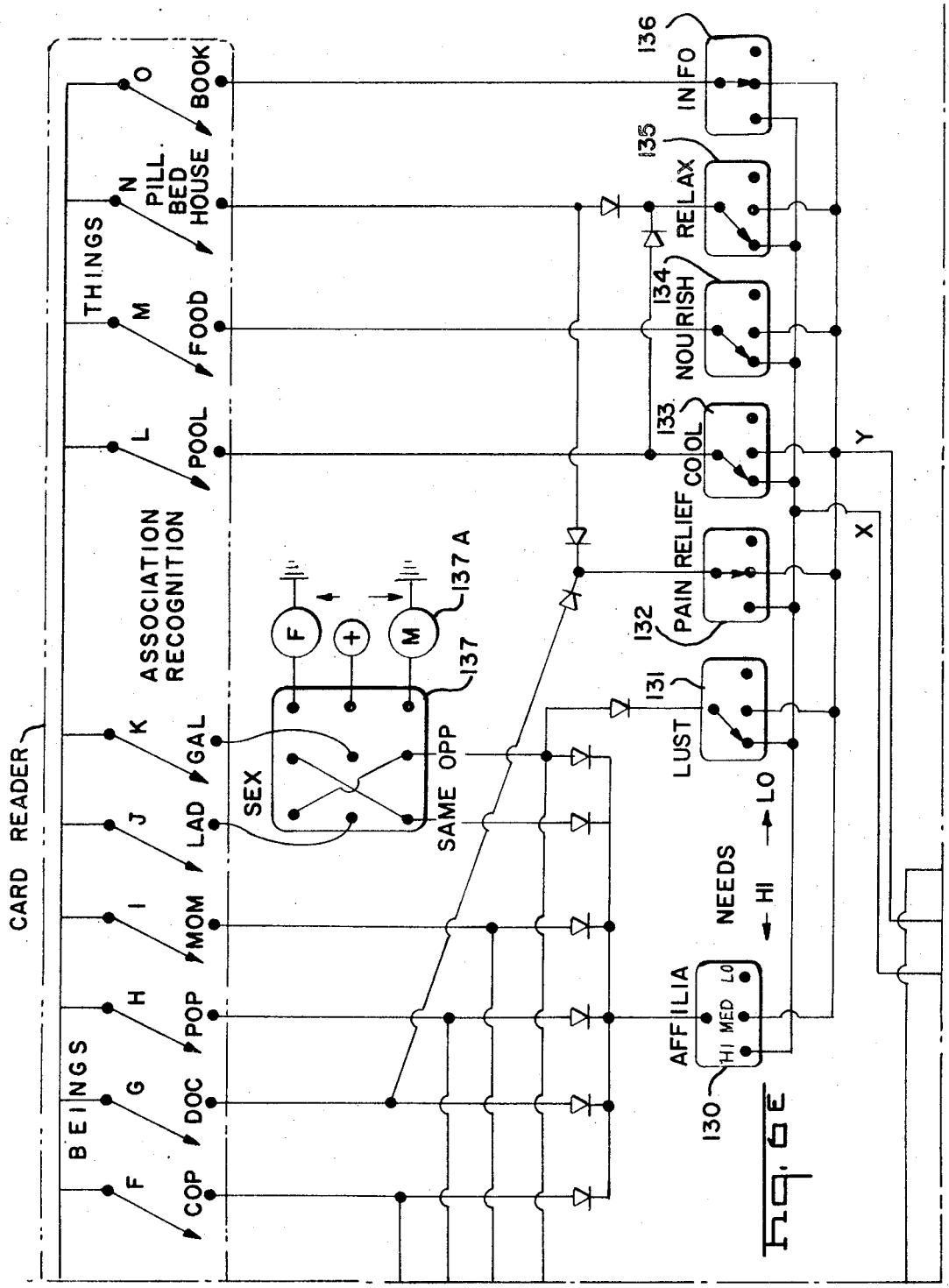

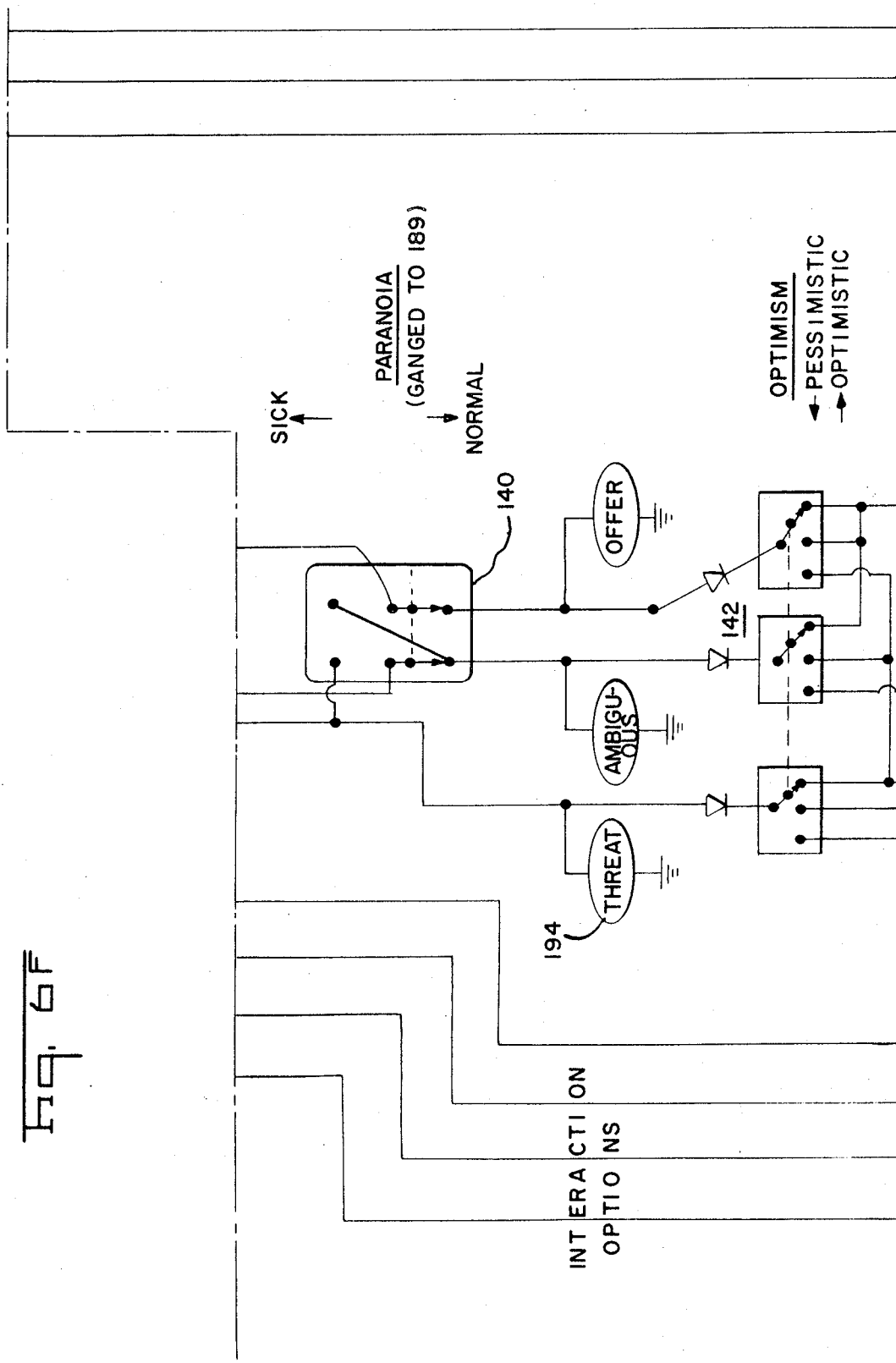

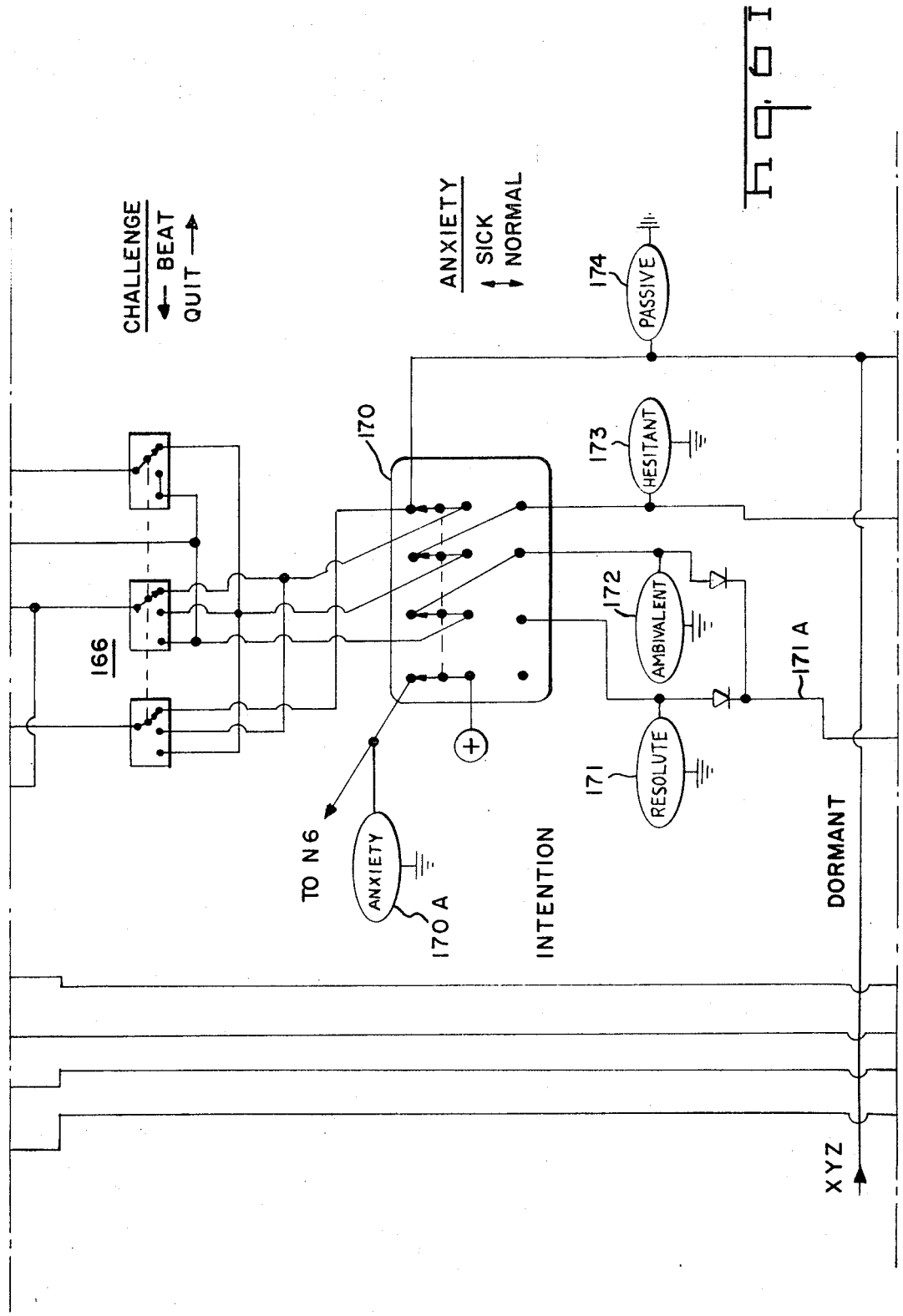

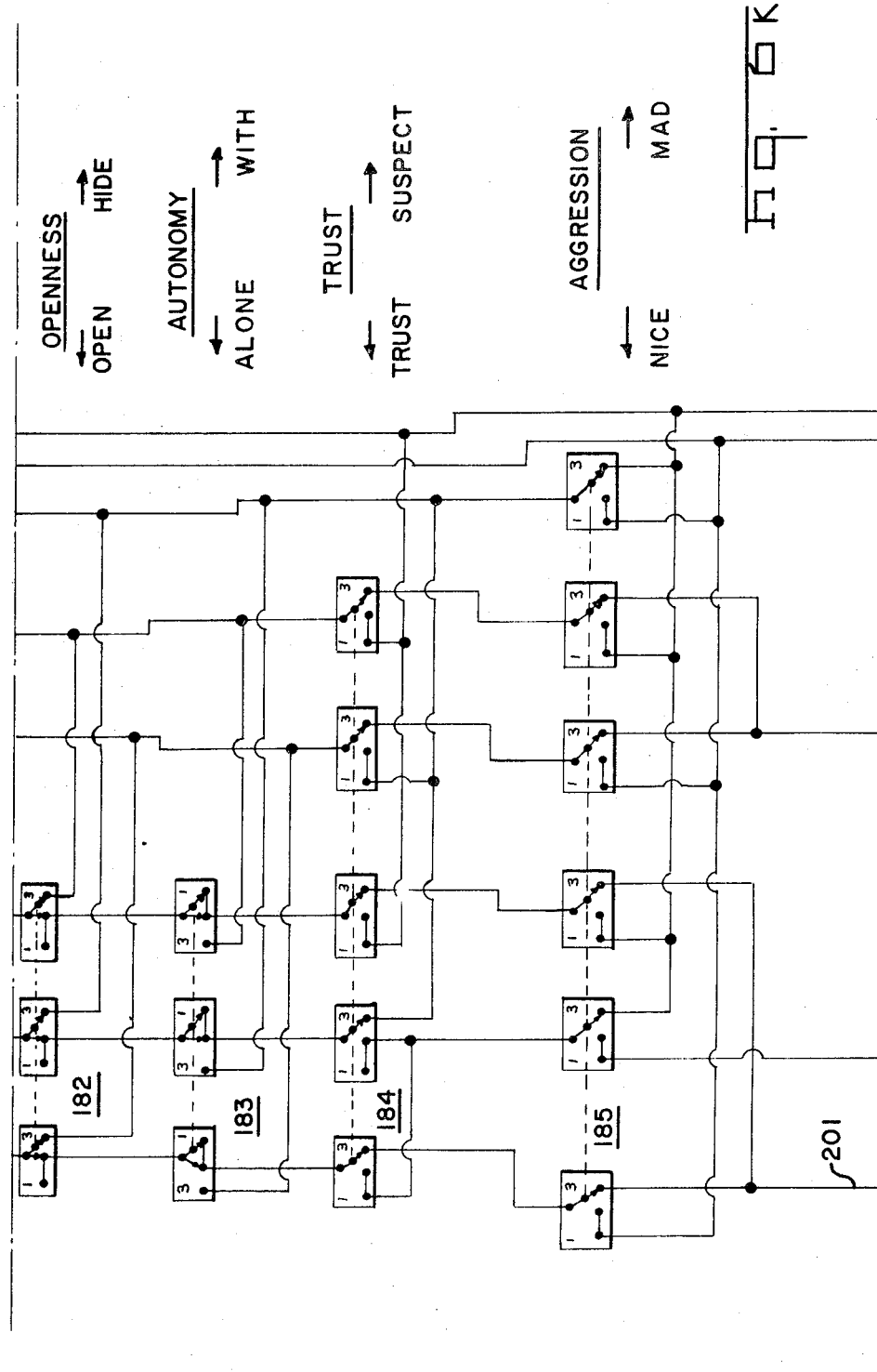

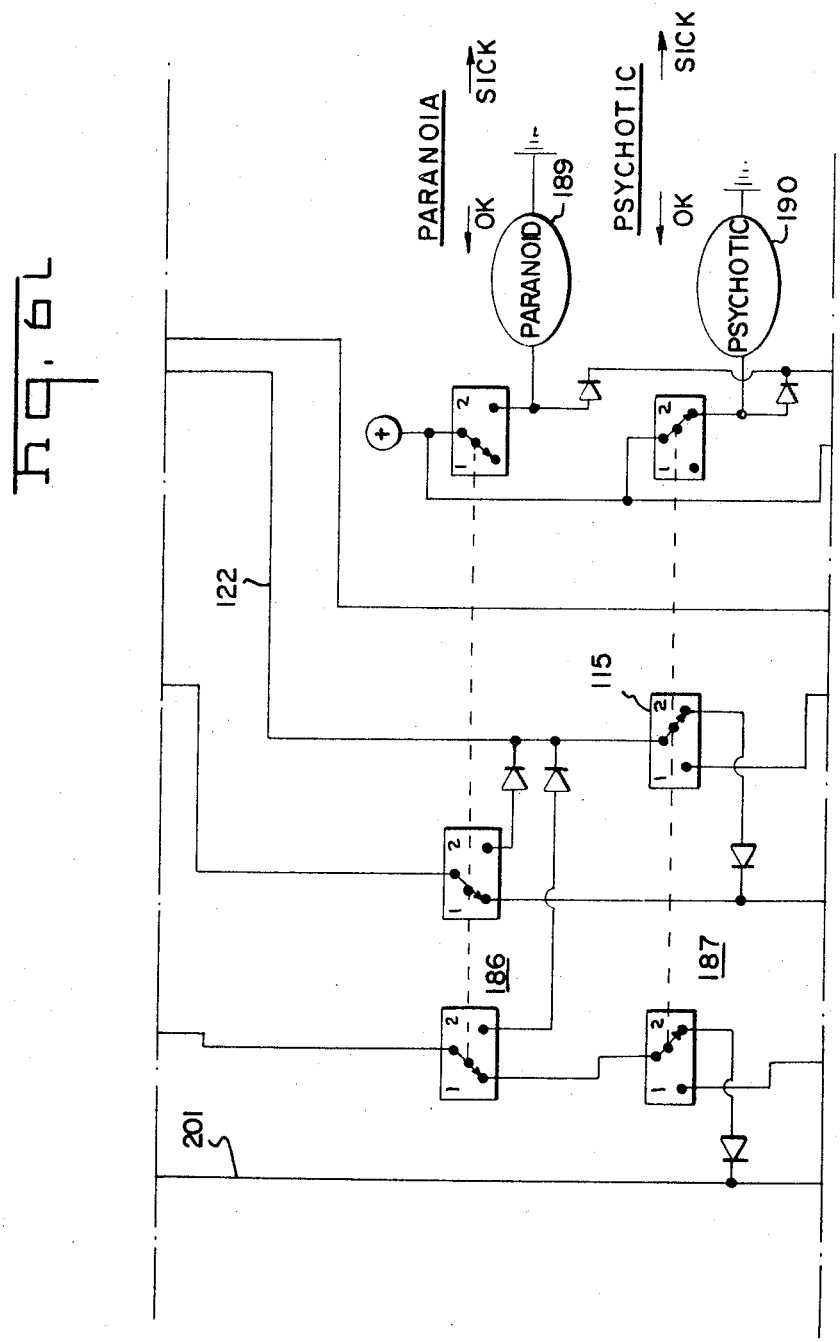

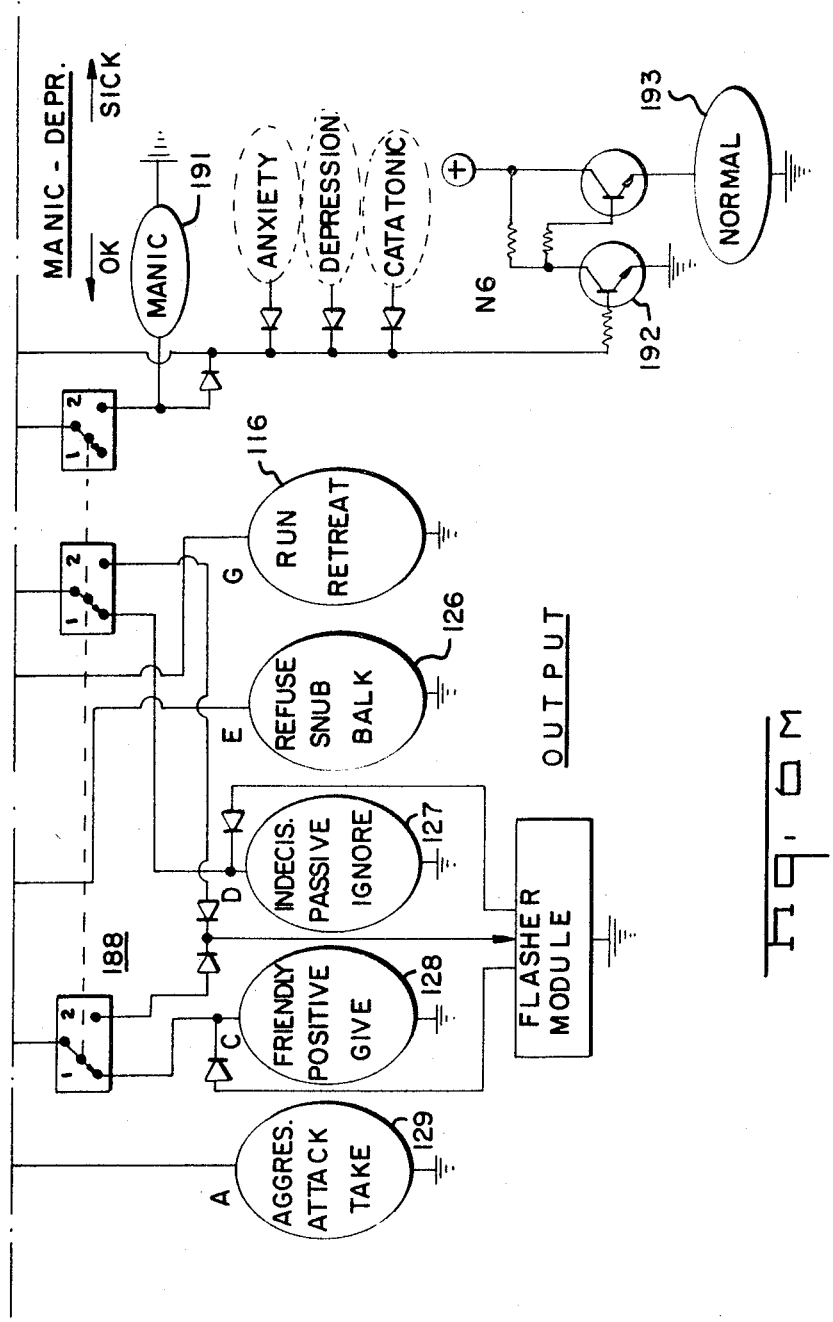

BEHAVIOR SIMULATOR

BACKGROUND OF THE INVENTION

This invention relates to human personality simulators and more particularly to a simulator suitable for teaching and demonstrating psychological and behavioral science principles, for research and analysis of the impact of personality characteristics and disorders upon behavior, for diagnosing the personality characteristic producing a particular type of behavior. Electronic computers have been used in the field of psychology, psychiatry, and the behavioral sciences to score tests, count answers, and select and/or print from a repertory of pre-stored statements.

As an example, U.S. Pat. No. 3,570,146 Golden describes a system for automatically testing applicants by including projecting means for sequentially displaying test questions or a scene or situations to which the question relates. U.S. Pat. No. 3,579,869 Hewitt describes electronic logic circuitry for determining the correctness of students' answers. While systems such as these are particularly useful is performing clerical tasks in education, there is a requirement in the behavioral sciences for a system which will simulate the interaction of the human personality with external stimuli and which will represent the expected human response in a large number of situations.

The principles of analysis of human behavior have been widely discussed, but these principles have never been applied to a human personality simulator. An example of papers which discuss some of the principles of continuous human behavioral model is: "A Cybernetic Model of Human Change and Growth", David A. Kolb, working paper, Alfred P. Sloan School of Management, Massachusetts Institute of Technology, 1971. The concept of analyzing interactive systems is discussed in "Principles of Systems", Jay W. Forrester, Massachusetts Institute of Technology, Cambridge, Massachusetts, 1968.

SUMMARY OF THE INVENTION

In accordance with this invention, a human personality simulator is based on the principles that the human personality is a complex, but single, overall system composed of subsystems that interact with each other. The categories or types of personality subsystems are the same for every individual. However, each subsystem parameter of one individual is "tuned" uniquely. An individual's unique personality is the result of the interaction of these uniquely "tuned" subsystems. While the foregoing principles are not universally accepted, I have found that they are very useful premises and the simulator of this invention is based upon these principles.

The simulator represents human personality with a finite number of parameters of behavioral conditions, needs, traits, attitudes and emotions. Each condition, need, trait, attitude or emotion is defined in terms of a relative scale or relative value system such a "more than normal" or "much less than normal". In one particular embodiment of the invention, each value of condition, need, trait, attitude or emotion is represented by a multiposition switch and the value is representated by a relative position of each switch.

In accordance with another aspect of this invention, input stimuli are represented pictorially on precoded cards which are inserted into the simulator. The response of the simulator is directly related to the specific input stimuli. These stimuli, in the particular embodiment, are categorized into three classes: beings or persons, statements or sounds, and objects or scenes. The simulator of this embodiment accepts up to three stimuli simultaneously. The simulator will accept any one statement or sound, and/or any one object or scene, and/or any one person or being simultaneously.

In from a to the stimuli, one of a number of visual output response indications is energizd. In a particular embodiment the outputs are classified into five categories which range from positive response to a retreat response. In addition to providing an output of the ultimate behavioral response, the simulator also provides indications which provide an insight into the interim conclusions of the perception process. For example, these interim output indicators include the specifying of the degree of attention directed to the stimuli, the relevance of the stimuli, whether the stimuli situation is perceived as a threat or as an offer, a classification of the degree of challenge or difficulty posed by the stimuli situation and the intensity of the will of the individual to respond to the stimuli. Appropriately labeled visual indicators are used for these interim outputs.

The stimuli are applied to the logic circuitry which includes the switches which represent the particular personality parameters as being more or less than average. In a particular embodiment, each of the parameters is represented on a three point scale although it will be understood that this principle can be enlarged upon to accommodate a five, seven, nine or even greater number of points on the scale. The more continuous the scale, the better the simulation. Further, these scales may be calibrated by matching actual human subject reactions to the identical stimuli in controlled test situations.

The logic circuitry of this invention includes sequential "decision tree" branching switches, which are adjustable. One particularly advantageous feature of this circuitry is that it is arranged so that the simulator is insensitive to stimuli that are solely of a visual nature if the initial condition of the simulator is set to a position in which the subject is "asleep". The principle of hierarchy is manifested by the simulator. For example, if the applied stimuli evokes intense fear, then other needs, attitudes, or considerations are irrelevant and are bypassed so that the response is determined primarily by the condition of fear or the need for survival.

One of the logic circuits which is particularly advantageous is the negator circuit. This circuit is normally on and is turned off when inhibited by another signal. Appropriate use of this type of logic produces great advantages in the personality simulator, which will be discussed subsequently.

In accordance with another important aspect of the invention, the simulator will produce an output response only if the applied stimuli has attracted attention in much the same way that a human reacts to stimuli only after the stimuli has attracted the attention of the human. For example, merely showing an object to a sleeping person elicits no reaction because the person is inattentive. Similarly, showing an object to the simulator that is "asleep" elicits no reaction. In the particular embodiment of the simulator three levels of attentiveness are provided: "Attentive", "aware" and "inattentive". The intensity of the stimuli is coded on the stimuli cards. This intensity alters the state of consciousness of the simulator by energizing a different circuit. Provision is made for the operator to select the initial or base physical and consciousness status, but these initial conditions are then altered by the intensity of the stimuli. For example, the initial setting may be "dormant" (physical) and "asleep" (consciousness). A purely visual stimuli such as a view of a book would have no effect but a strong stimuli such as a shouted message will wake the simulator and change the condition to "dull and drowsy".

In accordance with another aspect of this invention the simulator can be adjusted to incorporate personality aberrations or abnormalities such as paranoia, depression, anxiety, manic depression and catatonia. An abnormality is a distortion in thought processes that causes a shift from normal perception or evaluation. Paranoia, for example, heightens suspicion. Therefore, the simulator of this invention reduces the amount of trust and interprets "offers" as being ambiguous, and "ambiguous" situations as threats. The abnormality of depression, for example, shifts optimism toward pessimism in the logic circuitry and the final output.

The foregoing and other objects, features and advantages of the invention will be better understood from the following more detailed description, appended claims and drawings.

DESCRIPTION OF THE DRAWINGS

FIG. 1 is a flow sheet depicting the simulator conceptual process.

FIG. 1A shows the flow sheet symbology;

FIG. 2 shows examples of the stimuli cards;

FIG. 3 shows the switch bank forming a part of the card reader;

FIG. 4 shows a cross-section of the card reader;

FIG. 5 is a perspective view of the simulator showing the general arrangement of the device;

DESCRIPTION OF A PARTICULAR EMBODIMENT

Flow Sheet, FIG. 1

Figure 6B:
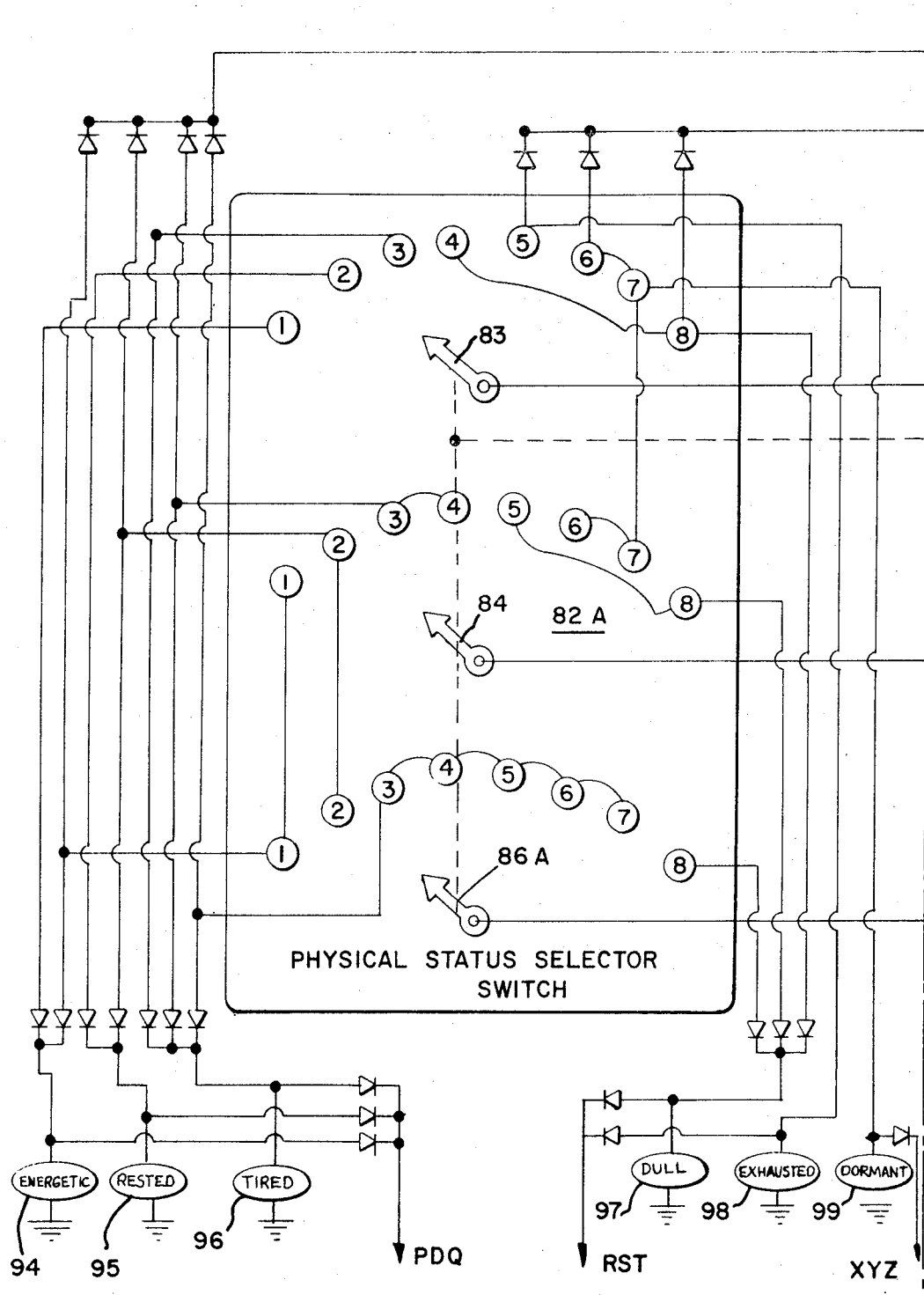
FIGS. 6 show the manner in which FIGS. 6A—6M fit together to form a schematic diagram of the simulator.

Referring to FIG. 1 the flow sheet summarizes the process by which the simulator makes an appropriate output response to an input stimuli. The input of stimuli is indicated at 11. As indicated at 12 these are classified as to their impact. For example, the impact of a visual stimuli will be different from that of a sound stimuli and both will be different from the condition of no input stimuli.

The input stimuli may change the physical condition as indicated at 13 or the conscious condition as indicated at 14. These conditions are initially manually set as indicated at 15 and 16.

Output 17 visually indicates the physical condition and output 18 visually indicates the consicious condition.

The input stimuli are classified as to the attentiveness of the subject being simulated as indicated at 19. The initial condition of attentiveness can be set to a catatonic level indicated at 20. Output 21 visually indicates the degree of attentiveness.

Each of the input cards also provides an associative memory as indicated at 22. For example, if the input stimulus is a snarling dog, the card will actuate circuits which will be recognized, as indicated at 23. The level of attentiveness energizes the associative memory inputs which are then applied to three circuits which classify the inputs at 24, 26, and 28.

For example, the inputs are classified as to a threat level, indicated at 24. This threat level may be modified for example by inputting a "paranoia" level at 25. The interim output 24A visually indicates the threat level.

At 26, the inputs are classified as to figure symbols. For example, if the stimuli includes a being the signal is directed to "needs" that are pertinent to beings in general at 27. Similarly, if the stimuli includes a being, a signal also proceeds to 35.

Need levels are adjustable as indicated at 27. For example, if the simulated personality has a high need for affiliation at 27, and if the applied stimuli include a being, then there is a signal from 26 and there exists an opportunity to fulfill a need, 28. Similarly at 28, if there is a high need for nourishment at 27 and if there is a signal from 23 that indicates that the applied stimuli includes a representation of food, there exists an opportunity to fulfill a need at 28.

At 30 the inputs are classified as to degree of relevance. Attitudes toward fulfillment of needs are adjustable at 32 and modify the degree of relevance. For example, if the simulated personality has a strong attitude for self gratification, and there is opportunity to fulfill a need, the situation is classified as Important. Interim visual output indications of the degree of relevance is provided at 33.

Signals from 30 and 29 are combined at 36 to determine intention options. The determination is modified by the level of anxiety and the attitude towards challenge at 38 of the simulated personality. Interim visual output indications of intentionality are provided at 39.

The inputs passing through 24 are classified as to degree of difficulty, at 29. The level of difficulty can be modified by adjusting the optimism level at 31. Interim visual output indications of the degree of difficulty are provided at 34.

The inputs passing through 26 are also classified to determine interaction options at 35. Interaction options are modified by the adjustment of attitudes re symbol figures as indicated at 37B and these attitudes, in turn are influenced by the sex of the simulated personality which is adjustable as indicated at 37A. For example, if the applied stimuli includes a Being who is represented as an attractive young woman and the simulated personality is a male who hates the opposite sex, the interaction options are thereafter limited to hostile or unfriendly responses.

Finally, the output response is selected by the simulator as indicated at 40. Signals from 35 and 36 are combined, and modified by moods and attitudes which are adjustable at 40A. The physical energy level, from 13, modifies the intensity of the response. Any one of five output indications is possible in the simulator under discussion and these are indicated at 41.

Input Stimuli Cards and Card Reader, FIGS. 2–4

FIG. 2 shows cards 50, 51 and 52. Each card has machine sensible codes or tabs 53–58, which are encoded representations of situational stimuli. FIG. 3 shows a set of leaf switches in the card reader. These switches are selectively actuated by the tabs on the cards. For example when the card 50 is inserted in the card reader the tab 53 actuates switch A, the tab 54 actuates switch B and the tab 55 actuates switch G. These switches complete a power circuit and thereby convert the tab positions into electrical signals.

Each of the cards represents a different situational stimuli. The card 50 is one which represents a statement or sound. The card 51 is one which represents a subject, person or being, and the card 52 is one which represents a thing, object, or scene. Each of the cards is constructed of a transparent plastic material and each has a visual representation of the stimuli which it represents. Because the cards are transparent each of the visual representations can be viewed when a plurality of the cards are inserted in the card reader. Cards may be inserted individually or in combination.

Note that each of the cards has a tab 53, 56 or 58 which actuates the A switch. This switch position indicates the presence of a stimuli. The card 50 has a tab 54 in a position which actuates the B switch. This is actuated whenever a noise stimuli is present. Each of the cards has a tab in another position to actuate the switch representing the specific associative memory. For example the tab 55 actuates the switch G to simulate associative memory associated with the statement NO! STOP!.

FIG. 4 is an end sectional view of the card reader. It shows the cards 50, 51 and 52 inserted in a slot guide 59 mounted on the panel face 60 of the simulator. The switches 61 include a number of switch leafs 62 which are selectively actuated by the tabs on the cards.

Pictorial View of Simulator, FIG. 5

FIG. 5 is a pictorial representation of the simulator embodiment of this invention. The simulator is portable and is self-contained in the case 63. A plurality of multiple position switches 64–68 and others can be set to one of three positions indicating needs, emotions, fears, loves and attitudes on a relative scale of 3.

The lid of the case includes a number of illuminated output indicators. These include the five final output indicators 69–73 and interim output indicators 74–75 and status indicators 76–78 and others.

The Schematic Wiring Diagram, FIGS. 6A–6M

Figure 6C:
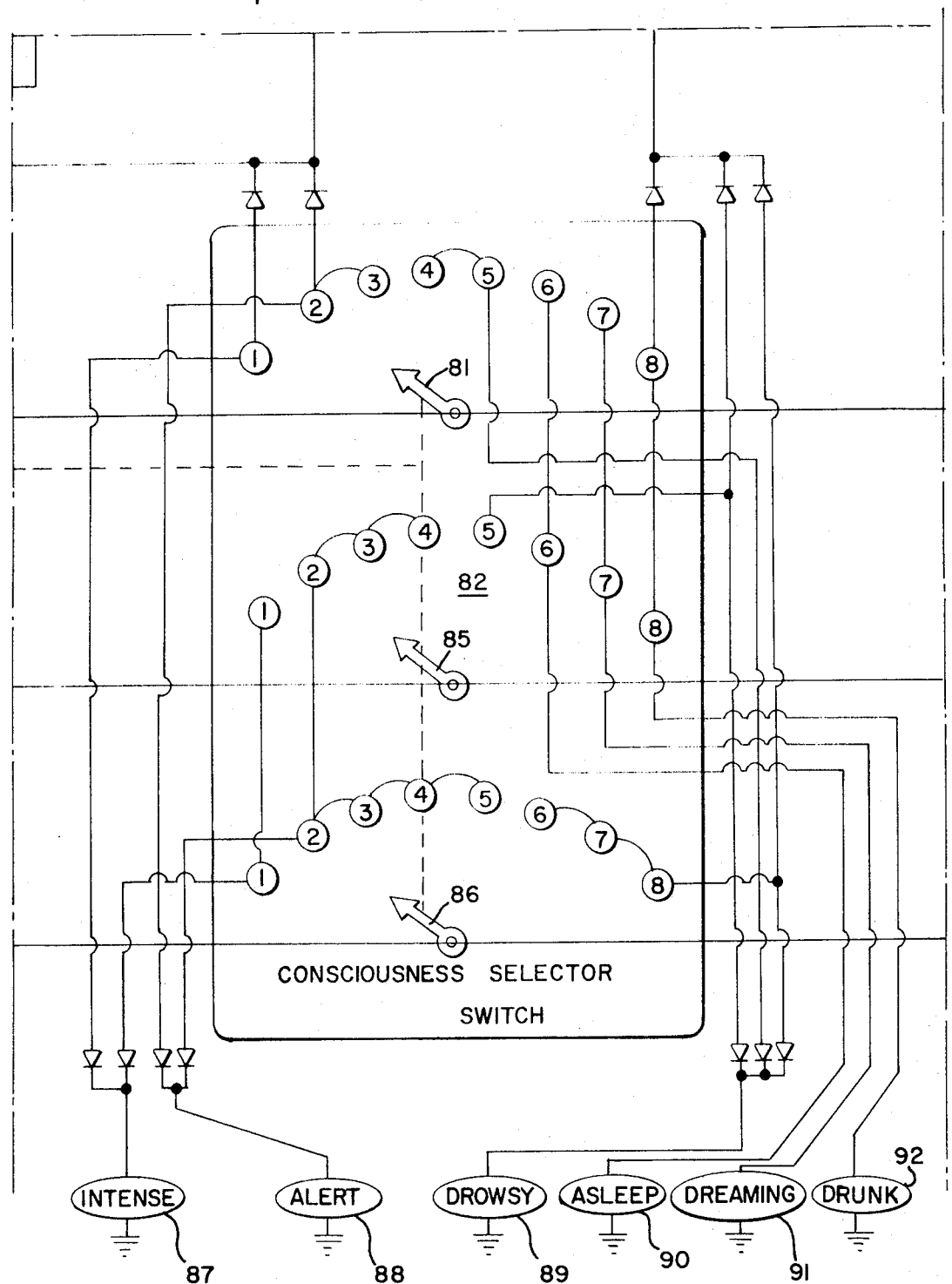

Physical and Consciousness Selectors, FIGS. 6B and 6C

D.C. power for the simulator is applied to the terminal 80 (FIG. 6D) and other points indicated by ⊕ When there is no card in the card reader, this D.C. voltage is applied through the normally closed contact 80B of the switch A. This voltage is applied to the top wiper 81 (FIG. 6C) of a consciousness selector switch 82. The voltage is also applied to the top wiper 83 of the physical status selector switch 82A (FIG. 6B). Switch wipers 81, 83–86, 86A are ganged.

These wipers can be manually set to any one of eight different positions. Initially, position 1 indicates a conscious condition of intense, position 2 and 3 — alert, position 4 and 5 — drowsy, position 6 — asleep, position 7 — dreaming, and position 8 — drunk. Indicator lamps 87—92 are selectively energized through the switch contacts of the switch 82 to indicate the state of consciousness. The energization of a particular indicator depends not only on the initial setting of the switch 82 but also on the stimuli card or cards inserted in the card reader. For example, assume the rotary switch 82 is in position 6. When no cards are in the card reader voltage is applied from terminal 80A through switch contact 80B (FIG. 6D) through wiper 81 (FIG. 6C) and through contact 6 of the switch to the indicator 90 which signals an "asleep" condition. When a card representing a visual stimuli is inserted in the card reader the A switch is actuated and the switch contact 80B is moved to the normally open position. This supplies voltage from terminal 80A through switch contact 93 to the wiper 85. Voltage is thereby applied through contact 6 to the "asleep" indicator light 90. However, when a stimuli card representing a sound is inserted in the card reader the switch B is actuated and the switch contact 93 is moved to the normally open position. Now voltage is applied to the wiper 86 and through switch contact 6 to the "drowsy indicator lamp 89.

Similar status indicators 94–99 are provided for the physical status indicator. Again, the particular indicator which is energized depends not only on the initial setting of the selector switch 82A, but on the type of stimuli card which is inserted in the card reader.

Catatonia and Electroshock Selectors, FIG. 6A

FIG. 6A shows a 3-pole double-throw switch 101. With the switch in the position shown a normal condition is obtained but when the switch is thrown to the left, a catatonic condition is simulated. In the normal position the "attentive" indicator light 102 receives an energizing voltage from the wiper of the physical status selector switch 82A. The "AWARE" light 103 normally receives an energizing voltage from the consciousness selector switch. Status output indicator lights 104 and 105 are normally energized when the switch 101 is in the left-hand position. The switch 106 simulates an electro-shock treatment when the switch contact is moved from its normally closed to its alternate position. This deenergizes "inattentive" lamp 105 and energizes "attentive" lamp 102. As will be subsequently apparent, other changes in logic circuitry are made by removal of the voltage from the negator N1 (FIG. 6H) the connection to which is taken from one side of the lamp 105.

Card Reader, FIG. 6D

When the switch 101 is in the normal position, and/or when either indicator 102 or indicator 103 is energized, voltage is present on the bus 110. This applies voltage to the contact of switch C and applies voltage through negator N4 to the contacts of switches D–O. Negator N4 includes a normally conductive transistor 111 and a normally nonconductive transistor 112. Voltage will be applied through transistor 111 to the switches D–O normally. There is one condition in which voltage will not be applied to these switch contacts. Switch 113 is a single-pole 3-position switch indicating a relative fear of animals. The lower position indicates a low fear of animals, the middle position a neutral fear of animals and the top position a high fear of animals. If the switch 113 is in the top position, and if switch C is closed indicating the presence of a "snarling dog" stimulus, voltage is applied to the base of transistor 112 turning it on. This cuts off transistor 111. In this case there is only one possible output condition. Voltage from the switch 113 is applied through diode 114, over line 122, to the "psychotic" switch 115. (FIG. 6L) If this switch is in the normal condition the "run or retreat" output indicator 116 (FIG. 6M) will be energized.

In addition to the switch 113 indicating a relative fear of animals, switches 117–120 are provided to simulate other fears and loves. Switch 117 indicates the relative hate or love of authority, switch 118 the relative love or hate of father, switch 119 the relative hate or love of mother and the switch 120 the relative hate or love of the opposite sex.

As previously noted, when a voltage from the fear of animal switch 113 appears on the line 122 there is only one normal possible output indication, namely energization of the "run/retreat" output indicator 116. Other combinations of closures of the switches 117–120 will impose voltages on the lines 123–125 which can cause energization of different combinations of the final output indicators 126–129. A voltage on line 123 can produce energization of any one of indicators 126, 127 or 128. A voltage on line 124 can result in energization of any one of indicators 116, 127 or 128. A voltage on line 125 can result in energization of any one of the five output indicators 116, 126–129. As an example, if an authority figure is included in the input stimuli and if the attitude toward authority is neutral, switch 117 is in the middle position, a voltage is applied to line 125. Because of this, it is still possible to energize any one of the final output indicators.

Card Reader and Needs Switches, FIG. 6E

A similar set of switches 130–136 provides relative adjustment of the parameters of need for affiliation, lust, pain relief, cooling, nourishment, relaxation and information. The switch 137 provides for denoting whether the simulated subject is a male or a female. In the lower position the switch simulates a male and in the upper position it simulates a female.

Figure 6G:
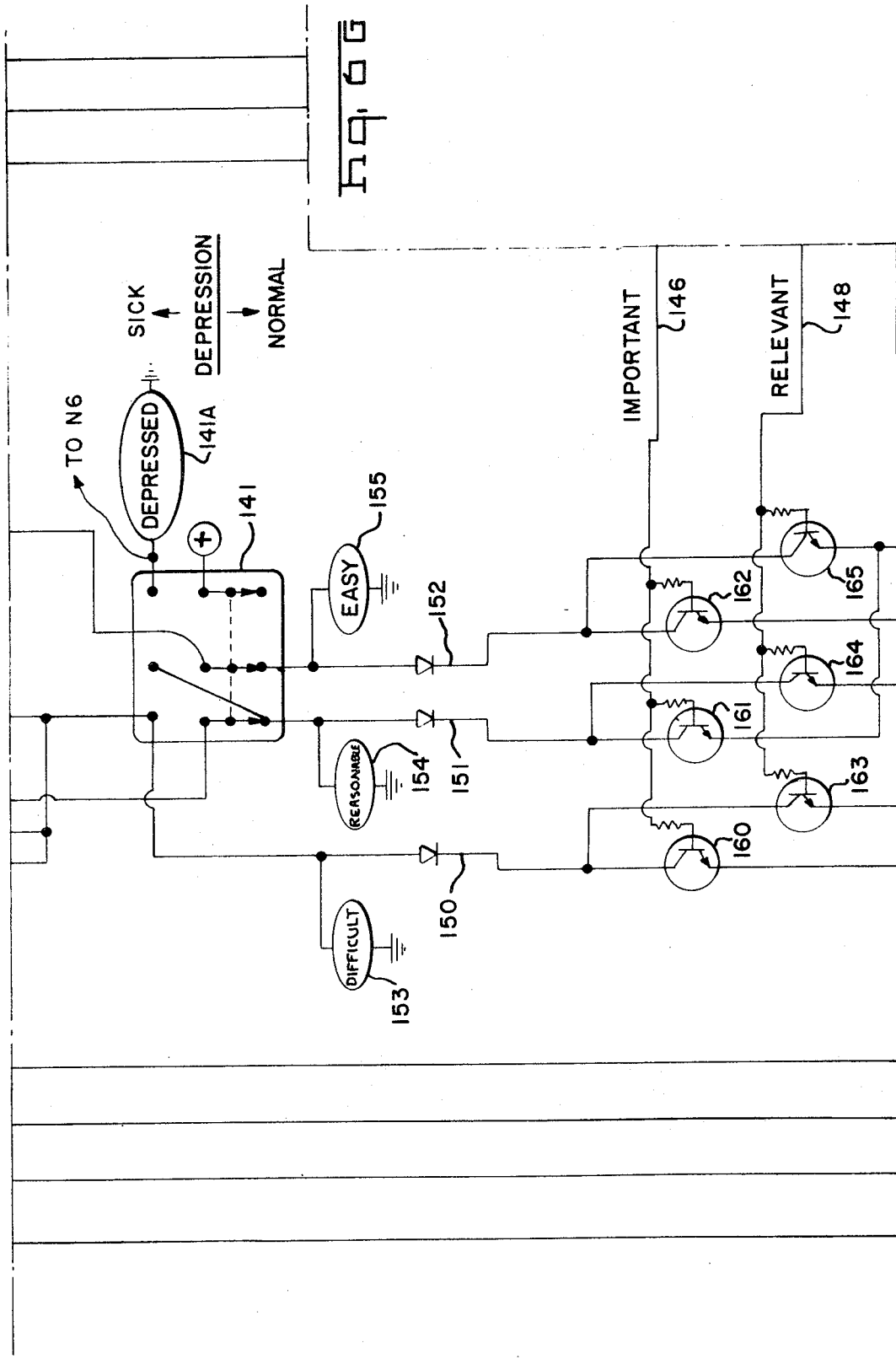

Paranoia, Optimism, Depression Switches, FIG. 6F and 6G

A 2-pole 2-position switch 140 is used to simulate paranoia. The lower position represents a normal condition. When the switch is in the upper position, circuit logic is altered. The relative degree of optimism is simulated by the 3-pole 3-position switch 142. A 3-pole 2-position switch 141 (FIG. 6G) is used to simulate depression. The lower position represents a normal condition. When the switch is in the upper position, indicator lamp 141A is energized and circuit logic is altered. The stimuli are classified as to whether there is a threat or offer and as to whether the situation is difficult or easy in the decision tree logic which includes switch 140. Classification of the input stimuli as to paranoia, optimism and depression results in a voltage on one of the lines 150–152 to indicate that the simulated subject considers the input stimuli to present a difficult, a reasonable or an easy situation. These three conditions are indicated by the interim output indicator lamps 153–155.

Figure 6H:
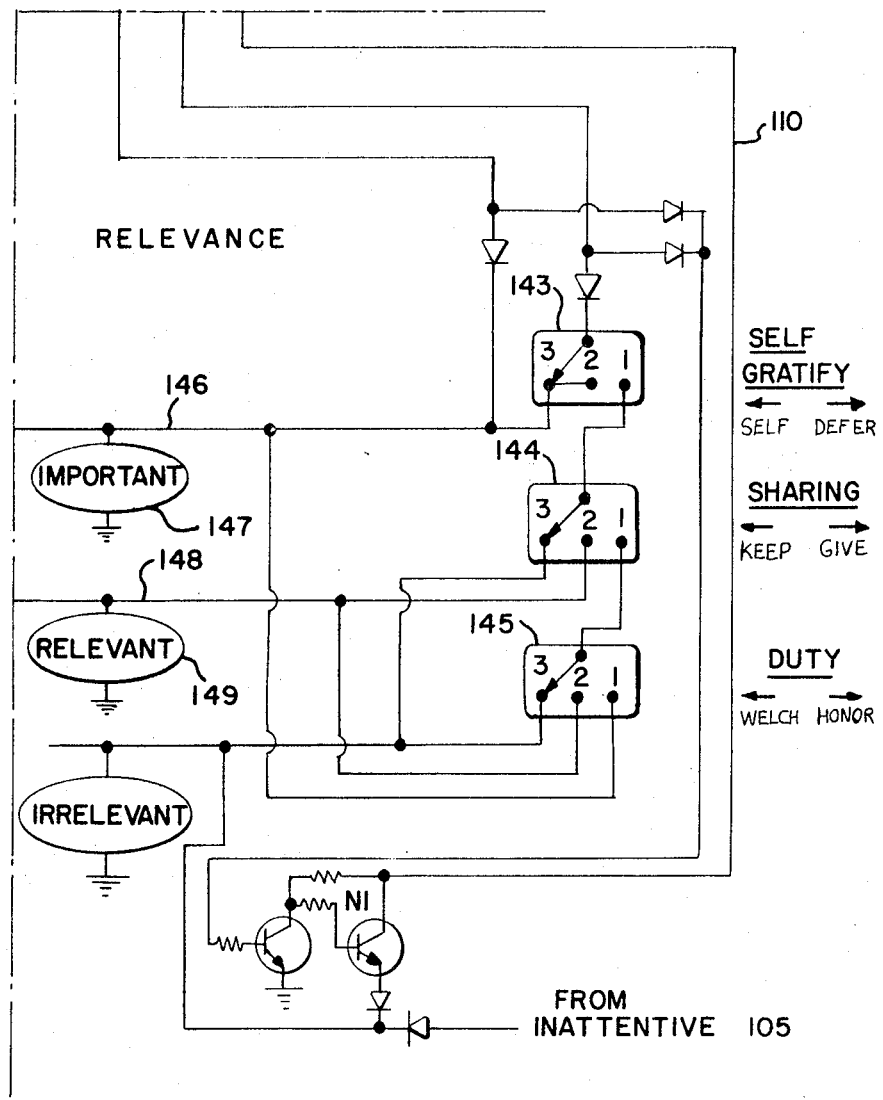

Relevance FIG. 6H

Referring to FIG. 6H, the input stimuli are classified as to relevance. This is accomplished in part by the switch 143 which is set to indicate the relative need for self-gratification, the switch 144 which is set to indicate the relative need for sharing and the switch 145 which is set to indicate the relative sense of duty. If an input stimulus is "important", a voltage is applied to the line 146 and the "ijportant" indicator 147 is energized. If the input stimuli is classified as relevant a voltage appears on line 148 and the "relevant" indicator 149 is energized.

The voltages indicating important, line 146, or relevant, line 148, are applied to AND gates which include the transistors 160–165. (FIG. 6G) The other inputs to these AND gates are the voltages on the lines 150–152 which represent the classification of the input stimuli as "difficult", "reasonable" or "easy". For example, if the input stimulus is considered to be important, (a voltage on line 146) and difficult, (a voltage on line 150), the transistor 160 is turned on.

Figure 6J:
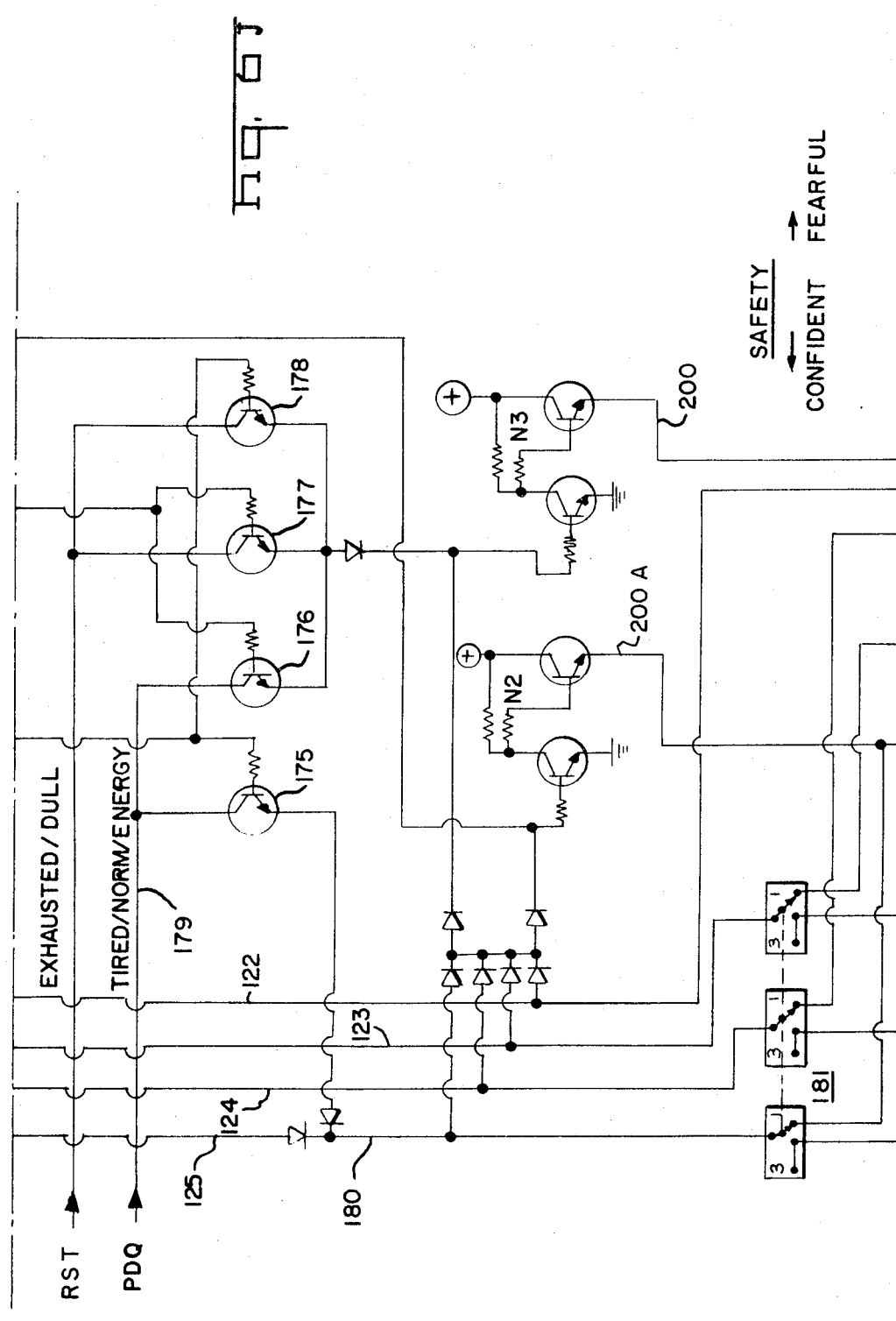

Challenge and Anxiety, FIGS. 6I and 6J

Output lines from the transistors 160–165 are applied to a 3-pole 3-position switch 166 which simulates the subject's relative attitude towards overcoming challenge. To simulate a relative desire for challenge the switch is set to the left-hand position. To indicate a relative predilection for quitting in the face of challenge the switch is set to the right-hand position. The middle position indicates neutrality of this trait.

A 2-position 4-pole switch 170 simulates a condition of anxiety. The lower position represents a normal condition. When the switch is in the upper position, indicator lamp 170A is energized and circuit logic is altered. The interim output indicator lamps 171–174 are connected to the outputs of the switch 170. Voltage on the lines applied to these lamps classify the response as being "resolute", "ambivalent", "hesitant" or "passive". The voltages on these lines are ANDED in transistors 175–178 (FIG. 6J) with the voltages from the physical status selector 82A (FIG. 6B). For example, a voltage on the line 171A indicating a "resolute" or "ambivalent" conclusion, and a voltage on the line 179 indicating a physical condition of "tired", "normal", or "energetic", will energize the transistor 175. This will apply a voltage to the line 180. In this case all of the final output indications (116, 126–129) are still possible.

Classification as to Antonomy, Trust,

Aggression, Paranoia, Psychosis, FIGS. 6J – 6M

Referring to FIG. 6K, the switches 181–185 simulate the personality parameters of relative attitudes toward safety, openness, autonomy, trust and aggression. FIG. 6L, the switches 186–188 simulate the conditions of paranoia, psychotic and manic depression. Switch 186 is ganged to switch 140. Status indicators 189–191 provide output indications of these three conditions. Note that if any of these conditions, or the conditions of anxiety, depression or catatonia, is being simulated, the transistor 192 in the negator N6 is turned on, thereby turning off the "normal" interim indicator lamp 193.

Operation of the System

An example of a simulation will best demonstrate the operation of the system. Assume that with no stimuli present, the initial consciousness selector switch 82 is set to position 8 and wiper 81 is energized, thereby simulating a drunk. Switch 137 is set to indicate that he is a male. Physical status switch 82A, with wiper 83 energized, is also on position 8, indicating a dull physical condition. Assume the subject being simulated hates his mother, switch 119 is set to the uppdr position; the subject has a medium need for pain relief, switch 132 is in the middle position; the subject has a high need to relax, the switch 135 is in the left-hand position; the subject has the characteristic of high self-gratification, the switch 143 is set to the left-hand position; the subject has a low willingness to share, the switch 144 is in the left-hand position; he has the characteristic of welching, the switch 145 is in the left-hand position; he is not paranoic, switch 140 is in the normal position; he is optimistic, switch 142 is in the right-hand position; he is not depressed, switch 141 is in the lower position; he has the characteristic of quitting, switch 166 is in the right-hand position; he has a high level of anxiety, switch 170 is in the upper position; he has a strong fear for his safety, switch 181 is is in the right-hand position; he is average about being open, switch 182 is in the middle position; he is neither independent nor dependent, switch 183 is in the middle position; he tends to be suspicious, switch 184 is in the right-hand position; and he tends towards aggressive or hostile behavior, switch 185 is in the right-hand position.

Before any stimuli cards are inserted in the card reader, the "drunk" indicator lamp 92, "dull" indicator lamp 97 and "aware" indicator lamp 103, "male" indicator lamp 137A and "anxiety" indicator lamp 170A, are energized.

Now assume that a card representing the visual picture of an elderly lady is inserted in the card reader. This card has tabs which close switches A and I. (Every card has a tab which closes switch A thereby indicating the presence of a stimuli.) Another card representing the sound stimulus of the word "Help" is inserted. This card has tabs which close switches A, B and D. (All sound stimuli have tabs which close switch B.) The third card is a picture of a bed. It has tabs which close switches A and N.

Insertion of these cards in the card reader causes a voltage to be applied through switch contact 80B and the normally open contact of switch A, through switch contact 93 and the normally open contact of switch B to the lower wiper 86 of the consciousness selector switch and the lower wiper 86A of the physical status selector switch. This energizes the "drowsy" light 89, the "dull" light 97 and the "aware" light 103. The voltage is applied through the switch 101 to the line 110. The voltage is applied through closed switch contact D to turn off negator N5. The negator N4 is on because it is always on unless a fear object is present which is not the case in this example. The "threat" light 194 is energized signalling that the subject being simulated views the situational stimuli as a threat.

The switch I is closed because the card having the picture of the elderly lady had a tab which depressed this switch. Voltage is applied through this switch to the switch 119. This switch is in the upper position because a mother hate is being simulated. Therefore the voltage is applied to the line 123.

Switch N is closed because the card depicting a bed had a tab which closed this microswitch. Voltage is applied through switch N to the selector switches 132 and 135. Switch 132 is in the neutral position so a voltage is applied to the line denoted Y. The switch 135 is in the left-hand position indicating a high need to relax. Therefore this switch applies voltage to the line x. Voltage on the x line energizes the "important" light 147. The simulated subject had a high need to relax so the bed caused an interim output indicating that the stimuli was considered important.

The voltage on the Y line is applied through switch 143 to the important light 147. The simulated subject had a medium need for pain relief but a high need for self-gratification so the bed produced an "important" interim output indication.

Recapitulating, the "threat" light 194 had a voltage applied to it because the switch D was closed representing a call-for-help stimulus. This same voltage is applied through the left-hand switch contact of the optimism switch 142, and through the depression switch 141 to energize the reasonable light 154. This voltage is applied to the collector of transistor 161. A voltage is present on the line 146 so the transistor 161 is turned on. The voltage on the emitter of transistor 161 is connected through the right-hand switch contact of switch 166 and through the contacts of switch 170 to energize the "hesitant" indicator light 173. This voltage is applied to the base of transistor 177. A voltage is applied to the collector of transistor 177 because the physical status selector 82A produced a voltage indicating an "exhausted/dull" condition. The voltage at the emitter of transistor 177 turns the negator N3 off. This removes voltage from the line 200. This terminates this loop.

However, the line 123 had a voltage on it and this voltage turns off negator N2 and removes any voltage from line 200A. The voltage on line 123 is applied through the right-hand switch contact of switch 181, through the right-hand switch contact of switch 184, through the second from the right switch contact of switch 185, and through the second from the left switch contact of switch 186 to the final output indicator light 126.

Recapitulating the simulation, the stimuli "HELP", an elerly lady, and a bed were presented to a simulated male subject having the following characteristics: drunk, mother-hate, high need for relaxation, moderate need for pain relief, need for self-gratification, a characteristic of keeping, a characteristic of welching, a characteristic of quitting in the face of challenge, a condition of anxiety, fear for safety, suspicion, and a characteristic of being hostile or aggressive. The response of the subject to these stimuli was a refusal to act, as indicated by energization of the output indicator 126.

The foregoing is but one example of a very large number of situations which can be simulated. The particular simulator just described provides for seven types of needs, six types of emotional conditions, five fears and loves and ten attitudes all of which can be adjusted over a range of values, and two sexes. This yields 352,638,658,432 possible combinations of personality settings, and as connected as shown in FIGS. 6 yields 235,371,484,128 combinations. It also provides for eight physiological/consciousness conditions and three intensities of stimuli to yield 24 status combinations. The stimuli cards provide 294 possible stimuli associative memory combinations. The particular simulator described then has a total number of situations or cases in excess of $1.2 \times 10^{15}$.

One further example illuminates the differentiation between a noise stimulus and a visual stimulus. Assume that the subject is initially simulated to be asleep, the rotary switch 82 is in position 6. The "asleep" light 90 is lit because a voltage is applied through the top switch wiper 81 to this light. When a visual stimulus card is inserted in the card reader the voltage is caused to be applied to the middle wiper 85. This still applies voltage to the "asleep" light 90. However, when a noise stimulus is inserted, thereby closing switch B, the voltage is caused to be applied to the lower wiper 86. In this case the "asleep" light 90 is turned off and the "drowsy" light 89 is turned on. A similar action turns off the "dormant" light 99 and turns on the "tired" light 96 to indicate physical status.

Modifications of the Invention

It will be appreciated that many modifications of the logic circuit depicted by way of example can be made. This logic is susceptible to programming on a large general purpose digital computer.

In another modification, simulators use a motor-driven selector to simulate changing base conditions by cycling over a period of time through various conscious or physical stages such as "energetic", "normal", and then becoming "tired", then "dull", and then "exhausted" and then finally falling "asleep". After an appropriate time, the simulator would rouse to "dull", then become "normal" or "energetic". The motor is programmed to run on a compressed time schedule, providing, say, 5 minutes for a sleep period and 10 minutes for a "normal" or "energetic" period. Then, as the simulator is exercised, it would "tire" as it is used and ultimately again need "sleep". A counter is incorporated to measure interruptions of sleep caused by strong stimuli, so that after removal of the stimuli the simulator would return to the "sleep" mode to get the appropriate "rest."

Figure 7:
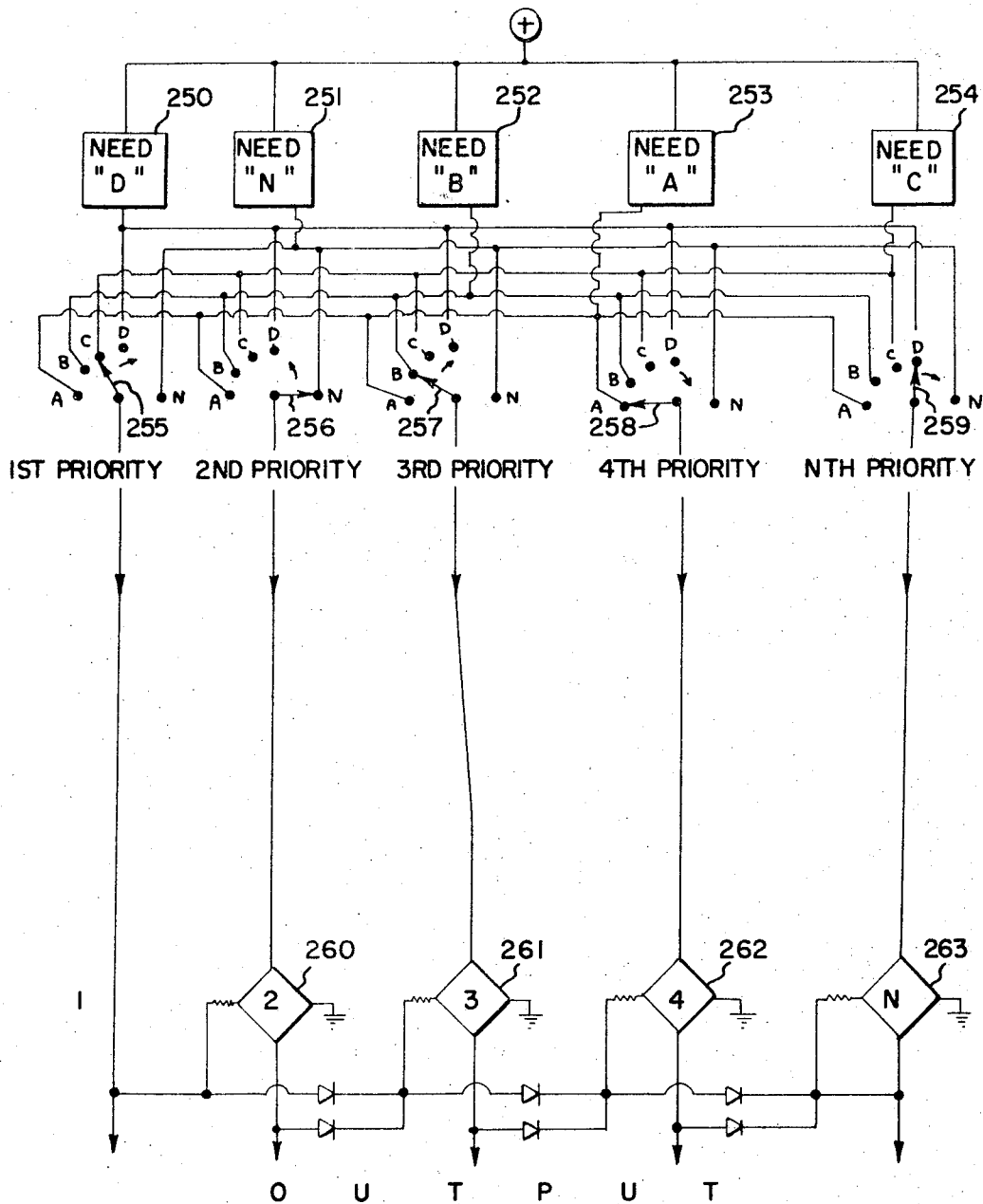
FIG. 7 shows a modification which includes simple electronic hierarchal logic.

Another modification, shown in FIG. 7, includes simple electronic hierarchal logic for making decisions based upon assigned priorities. If two or more needs, represented by the need switches 250–254, are present simultaneously, the need which has been assigned the highest priority will prevail over needs that have been assigned lower priorities. Implicit in this is the assignment of a ranking of priority of the various needs. In the simulator this is done by using selector switches 255–259 to connect the appropriate priority to the appropriate switch representing a need parameter.

The switches 255–259 are connected to circuitry which includes the negators 260–263. If one negator is on, it will produce an output only if no negator of higher priority is on. In the example shown the switches 255–259 are set so that the first priority is assigned to need "C", the second to need "N", the third to need "B", the fourth to need "A", and the Nth priority to need "D." As an example of operation, if needs "D" and "A" are present because these switches are set, need "A" will prevail since "A" is fourth priority which outranks need "D."

When simulating a particular personality, the initial setting of priorities could be based upon a simple questionnaire or test that requires answers to such questions as "Which is more important, sex (B) or food (E)?" and "Which is more important, food (E) or safety (G)?" or "Which is more important, sex (B) or safety (G)?" etc. This technique is not limited to "needs". It can be used to select one choice from any number of alternatives.

The embodiment described can also be modified to respond to other attention-getting stimuli, in addition to the stimuli cards. Receptors, such as a temperature-sensing switch or/and a pressure sensitive switch and/or a vibration-sensing reed switch, or moisture sensor, can be used to simulate the "touch" sense and could respond to heat, touch, water, or vibration. These switches would be wired in parallel with the card reader.

A microphone, in conjunction with an elemental amplifier driving a relay, could similarly be added. With any of these five sensors attached, the simulator's attention logic could be energized when appropriately actuated. For example, by speaking loudly, the operator could "get the attention" of the simulator. Or by hitting the pressure sensor, or by shaking the simulator, or by holding a match near it.

Instead of using indicator lamps to report the output of the simulator, the simulator could be appended with an audio output device to give an oral or spoken response. A voice response unit, such as that manufactured by Periphonics, Inc., could be triggered to output pre-stored phrases through an audio amplifier.

Instead of just illuminated words on the display panel, the simulator would then also be able to "speak" its reaction/response. The voice response unit would be activated to give the response "out loud". Simple logic circuits would assure proper syntax and appropriateness, such as

| want | it | | peppy | sure wish I had it |
|---|---|---|---|---|
| don't want | you | | tired | may I have it? |
| I like | what you said | + I feel | dull | please give it. |
| don't like | this situation | | drowsy | give it to me |
| need | | | drunk | I'm taking it take it away I don't care | so that you might hear,

"I don't want it. I feel drowsy. Take it away."

The phrase "library" could be expanded to include specific references to the applied stimuli, such as "I need (food) etc."

The simulator could be mounted on a mobile base that would be motor driven, so that it could literally "approach" the operator, or "retreat", or stand still.

And ultimately, the simulator could be part of a larger system that includes "vision" or "sight." A TV camera could scan an offered visual stimuli, match the picture with a prestored catalog of visual patterns, and then "recognize" the stimuli.

The basic simulator of personality can, therefore, be the core of robot-like devices — giving robot devices a "personality" or "character."

For example, the simulator could be used in conjunction with the type robot described by L. L. Sutro and W. L. Kilmer in "Assembly of Computers to Command and Control a Robot", as published by the M.I.T. Instrumentation Laboratory, Cambridge, Mass. in Dec. 1969. The Sutro/Kilmer robot had TV camera "vision" and limited ability to "recognize" objects.

The foregoing and other modifications within the true spirit and scope of this invention are covered by the appended claims.

What is claimed is:

1. A variable personality simulator comprising:
machine sensible encoded representations of human environmental stimuli,
input means for reading said encoded representations of human environmental stimuli,
output means indicating a particular behavioral response to said stimuli, and
a plurality of adjustable logic means, each logic means being selectively adjustable to represent human characteristics on a relative value scale, the encoded representation of said stimuli being applied through said logic means to selectively actuate particular output means.

2. The simulator recited in claim 1 wherein said input means include:
a card reader responsive to perturbations in encoded cards to convert said machine sensible codes into electrical signals representing memory associated with the environmental stimuli denoted by the cards.

3. The simulator recited in claim 2 wherein said machine sensible encoded representations of human environmental stimuli are cards representing different objects or scenes, different persons or beings, and different statements or sounds each having different machine sensible codes and wherein said card reader includes a plurality of switches which are selectively actuated when different cards are inserted into said card reader.

4. The simulator recited in claim 3 wherein each of said cards is made of a transparent material and wherein each card has a pictorial representation of an object or scene, person or being, or statement or sound thereon so that a plurality of the visual representations can be viewed through the transparent cards when they are inserted in said card reader.

5. The simulator recited in claim 1 wherein said logic means includes a plurality of decision tree logic circuits, said encoded representations of stimuli being applied through said decision tree logic circuits to said output means.

6. The simulator recited in claim 1 wherein said adjustable logic means includes:
a physical status selector switch having a plurality of positions each representing the physical condition of the subject being simulated, the energization for said output means being applied through the positions of said physical status selector switch so that the output means which is energized will be determined in part by the position of said physical status selector.

7. The simulator recited in claim 6 further comprising: an indicator connected to each position of said physical status switch, each indicator providing a visual indication of the physical status of the subject being simulated.

8. The simulator recited in claim 1 wherein said adjustable logic means includes a consciousness selector switch having a plurality of positions each indicating a particular condition of consciousness of the subject being simulated, the energization for said output means being applied through said consciousness selector switch so that the output means which is energized will be determined in part by the position of said consciousness selector.

9. The simulator recited in claim 8 further comprising:
an indicator connected to each position of said consciousness selector switch, each indicator providing a visual indication of the conscious state of the subject being simulated.

10. The simulator recited in claim 1 wherein said output means includes a plurality of visual indicators each representing a different behavioral response including an aggressive response, a positive response, a passive response, a refusal response and a retreat response.

11. The simulator recited in claim 10 further comprising:
a card reader having a plurality of switches which are selectively actuated by perturbations on cards inserted therein,
a physical status selector having a plurality of positions each representing the physical condition of the subject being simulated, the energization for said output means being applied,
a consciousness selector having a plurality of positions each indicating a particular condition of consciousness of the subject being simulated,
energization for said output means being connected through said physical status selector, said consciousness selector and said card reader switches to selectively energize one of said output indicators.

12. The system recited in claim 11 wherein said adjustable logic means comprises: a plurality of multiple position switches each having positions representing at least a high, neutral, or low parameter of human fears, loves, needs, emotional conditions and attitudes, the energization for said output means connected through said multiple position switches so that energization of said output means is dependent upon the position of said switches.

13. The system recited in claim 1 wherein said adjustable logic means includes priority circuits each adjustable to assign a relative priority to certain of said human characteristics.

* * * * *

PO-1050
(5/69)

UNITED STATES PATENT OFFICE
CERTIFICATE OF CORRECTION

Patent No. 3,748,750            Dated July 31, 1973

Inventor(s) Peter E. Viemeister

It is certified that error appears in the above-identified patent and that said Letters Patent are hereby corrected as shown below:

Column 2, line 8, "from a" should be --response--.

Signed and sealed this 19th day of February 1974.

(SEAL)
Attest:

EDWARD M. FLETCHER, JR.            C. MARSHALL DANN
Attesting Officer                      Commissioner of Patents